(12) United States Patent
Drazic et al.

(10) Patent No.: US 10,931,936 B2
(45) Date of Patent: Feb. 23, 2021

(54) PLENOPTIC SUB APERTURE VIEW SHUFFLING FOR A RICHER COLOR SAMPLING

(71) Applicant: INTERDIGITAL CE PATENT HOLDINGS, Paris (FR)

(72) Inventors: Valter Drazic, Betton (FR); Arno Schubert, Chevaigne (FR); Nicolas Le Scouarnec, Liffre (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 74 days.

(21) Appl. No.: 16/314,516

(22) PCT Filed: Jun. 27, 2017

(86) PCT No.: PCT/EP2017/065922
§ 371 (c)(1),
(2) Date: Dec. 31, 2018

(87) PCT Pub. No.: WO2018/002097
PCT Pub. Date: Jan. 4, 2018

(65) Prior Publication Data
US 2019/0166335 A1 May 30, 2019

(30) Foreign Application Priority Data
Jun. 30, 2016 (EP) ..................... 16305822

(51) Int. Cl.
*H04N 9/04* (2006.01)
*H04N 9/07* (2006.01)
(Continued)

(52) U.S. Cl.
CPC ....... *H04N 13/257* (2018.05); *H04N 5/22541* (2018.08); *H04N 5/23232* (2013.01);
(Continued)

(58) Field of Classification Search
CPC ........... H04N 5/23232; H04N 5/22541; H04N 5/2254; H04N 13/257; H04N 13/296;
(Continued)

(56) References Cited

U.S. PATENT DOCUMENTS 6,909,554 B2 *  6/2005  Liu ..................... G02B 6/4201
                                                          359/626
8,345,144 B1 *  1/2013  Georgiev ............... G03B 17/00
                                                          348/340

(Continued)

FOREIGN PATENT DOCUMENTS

CN      102812709 A       12/2012
JP      409130818          5/1997
KR      1020140061234      5/2014

OTHER PUBLICATIONS

JP409130818A Englisih Abstract.
(Continued)

*Primary Examiner* — Pritham D Prabhakher
(74) *Attorney, Agent, or Firm* — Lily Neff (57) ABSTRACT

A system and method for generating multiple images with rich color acquisition using a plenoptic camera having a main lens disposed in front of a micro array of lenses, a mosaic color filter array and an image sensor, characterized in that it comprises: capturing a first set of images using an ordinary state of an electrically controllable birefringent medium being disposed between said main lens and said micro array of lenses, said ordinary state providing an ordinary ray to each pixel; capturing a second set of images using an extraordinary state of said electrically controllable birefringent medium, said extraordinary state splitting the light from said main lens into an ordinary ray and a extraordinary ray respectively impinging on two adjacent pixels of different colors, said extraordinary ray being shifted by distance of one pixel on said image sensor;
(Continued)

performing a weighted subtraction of information about said second set of images from information about said first set of images; and generating a final set of images with rich color information from said weighted subtraction and said first set of images.

20 Claims, 4 Drawing Sheets (51) Int. Cl.
*H04N 5/232* (2006.01)
*H04N 13/257* (2018.01)
*H04N 13/296* (2018.01)
*H04N 5/225* (2006.01)
*H04N 13/232* (2018.01)

(52) U.S. Cl.
CPC .......... *H04N 9/045* (2013.01); *H04N 9/0451* (2018.08); *H04N 9/0455* (2018.08); *H04N 9/07* (2013.01); *H04N 13/232* (2018.05); *H04N 13/296* (2018.05)

(58) Field of Classification Search
CPC .... H04N 13/232; H04N 9/045; H04N 9/0455; H04N 9/0451; H04N 9/07
USPC ........................................................ 348/273
See application file for complete search history.

(56) References Cited

U.S. PATENT DOCUMENTS

| | | | | |
|---|---|---|---|---|
| 8,754,829 | B2* | 6/2014 | Lapstun | G02B 26/085 345/6 |
| 2004/0119949 | A1* | 6/2004 | Ito | H04N 9/3105 353/31 |
| 2006/0285360 | A1* | 12/2006 | Hasei | G02B 3/0012 362/627 |
| 2011/0001866 | A1 | 1/2011 | Katsuda et al. | |
| 2011/0142339 | A1 | 6/2011 | Singh et al. | |
| 2013/0169855 | A1* | 7/2013 | Ng | H01L 27/14627 348/345 |
| 2013/0270421 | A1 | 10/2013 | Kanamori et al. | |
| 2014/0035959 | A1 | 2/2014 | Lapstun | |
| 2015/0286340 | A1* | 10/2015 | Send | G01J 1/0437 345/175 |
| 2015/0362637 | A1* | 12/2015 | Kawata | G02F 1/133526 359/723 |
| 2016/0057407 | A1* | 2/2016 | Klehm | H04N 13/257 348/343 |

OTHER PUBLICATIONS

Levoy, M. et al., Recording and Controlling the $D Light Field in a Microscope Using Microlens Arrays, Journal of Microscopy 235 (2): 144-162, Aug. 2009.

Oldenbourg, R., Polarized Light Field Microscopy: An Anaylitical Method Using a Microlens Array to Simultaneously Capture Both Conoscopic and Orthoscopic Views of Birefringent Objects, Journal of Microscopy-Oxford, 231 (3)419-432, Sep. 2008.

ISR for PCT/EP2017/065922 dated Sep. 6, 2017.
EP Search Report for EP16305822 dated Dec. 5, 2016.
KR1020140061234 English Translation.

* cited by examiner

PLENOPTIC SUB APERTURE VIEW SHUFFLING FOR A RICHER COLOR SAMPLING

This application claims the benefit, under 35 U.S.C. § 365 of International Application PCT/EP17/065922, filed Jun. 27, 2017, which was published in accordance with PCT Article 21(2) on Jan. 4, 2018 in English and which claims the benefit of European patent application 16305822.5, filed Jun. 30, 2016

TECHNICAL FIELD

The present disclosure relates generally to digital image processing and more particularly to plenoptic imaging techniques using demosaicing.

BACKGROUND

This section is intended to introduce the reader to various aspects of art, which may be related to various aspects of the present invention that are described and/or claimed below. This discussion is believed to be helpful in providing the reader with background information to facilitate a better understanding. Accordingly, it should be understood that these statements are to be read in this light, and not as admissions of prior art.

Capturing the scene's light field has been an old interest in the field of computational photography. However, the recent release of hand held plenoptic cameras have introduced the potential of light field imaging to the mass market. A plenoptic camera uses a micro lens array that is positioned in the image plane of a main lens and before an array of photo sensors onto which one micro-image (also called sub-image) is projected. By placing a micro lens array between the main lens and the sensor, a plenoptic camera captures the direction of the light bundles that enter the camera, in addition to their position, intensity and color. Captured data is then demultiplexed to provide a matrix of horizontally and vertically aligned views from slightly different points of view over the scene. Consequently, each micro-image depicts an area of the captured scene and each pixel associated with that micro-image shows this certain area from the point of view of a certain sub-aperture location on the main lens exit pupil. The raw image of the scene is then obtained as a result of the sum of all the micro-images acquired from respective portions of the photo-sensors array.

With the light fields, a number of natural applications have risen such as depth estimation or post-capture refocusing. Raw data conversion is complex and involve several issues that need to be resolved. One such issue is that of accurate color conversion. Demosaicing processes aim to recover the color content of the scene from a mosaicked captured raw data. Unfortunately, many practical problems exist that interfere with full color image reconstruction. Another problem occurs when performing geometric operations. These operations often cause errors that are due to poor calculation of interpolated color values. These and other issues, impact full recovery and color conversions such as those addressed by demosaicing processes. Consequently, there is a need for improved techniques that can provide better color recovery using captured raw data.

SUMMARY

A system and method for generating multiple images of different color intensity and characteristics using a plenoptic camera having a main lens disposed in front of a micro array of lenses having a plurality of apertures. In one embodiment the method comprises capturing a first set of images using a first state of an electro optical polarization modulator and capturing a second set of images using a second state of an electro optical polarization modulator. The modulator is disposed between said main lens and array of lenses with plurality of apertures. Subsequently, information is subtracted about the second set of images from information about the first set. A final set of images is generated after the subtraction such that the final set of images have enhanced color intensity and characteristics.

In another embodiment, a system for generating multiple images of different color intensity and characteristics is provided comprising a main lens disposed in front of a micro array of lenses associated with a plurality of apertures and an electrically controlled electro optical modulator disposed between the micro lens and the array of lenses. The electro optical modulator functioning between a first state and a second state upon application of an electrical voltage. Means for capturing a first set of images using said first state of an electro optical polarization modulator and means for capturing a second set of images using a second state of an electro optical polarization modulator is provided. A processor configured to subtract information about the second set of images from information about the first set of captured images to create a final set of images with enhanced color intensity and characteristics is also provided.

Additional features and advantages are realized through the techniques of the present disclosure. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The present disclosure will be better understood and illustrated by means of the following embodiment and execution examples, in no way limitative, with reference to the appended figures on which.

In FIGS. 1-4, the represented figures provide examples that are purely functional entities and do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DESCRIPTION

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modification.

In regular cameras, a lens is used to focus the light reflected or emitted from objects into a real image on the light-sensitive surface, inside a camera during a timed exposure. With an electronic image sensor, an electrical charge is produced at each pixel, which is then processed and stored in a digital image file for further use. In classic photography, the focal surface is approximately a plane or focal plane. The focal surface is perpendicular to the optical axis of the camera.

By contrast, in a plenoptic camera, each micro-image depicts an area of the captured scene and each pixel associated with that micro-image shows this certain area from the point of view of a certain sub-aperture location on the main lens exit pupil. The raw image of the scene is then obtained as a result of the sum of all the micro-images and the raw image contains the angular information of the light-field. Consequently, neighbor pixels in a raw image contain different angular information as each pixel corresponds to a different view.

Figure 1:
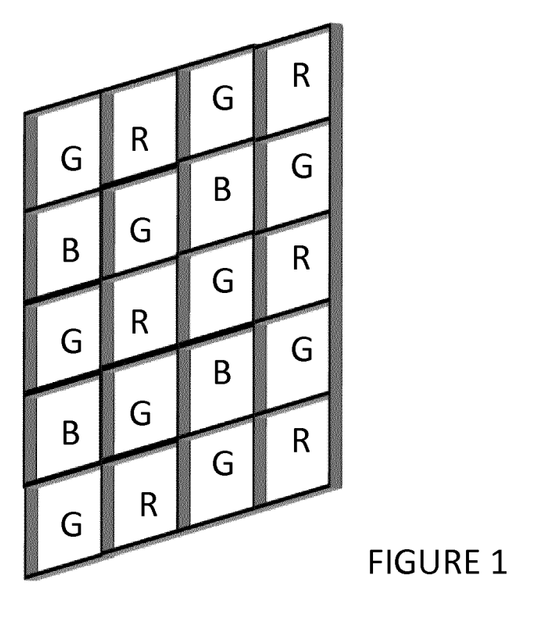
FIG. 1 is a block diagram depiction of showing a color filter array (CFA) used in a demosaicing process.

FIG. 1 is a depiction of a plenoptic micro-image matrix using a color filter array (CFA) used in a demosaicing process. Color filter arrays are used in demosaicing processes are digital image processing techniques that use a color filter array to reconstruct a full color image from incomplete color samples. The color samples are often an output of one or more image sensors overlaid with a CFA. A color filter array is a mosaic of color filters in front of one or more image sensors. Commercially, the most commonly used CFA configuration is the Bayer filter. The example of FIG. 1 provides an example of such a filter. As shown, the alternating red (R) and green (G) filters for odd rows, are further alternated in even rows with intervening rows that include interspersed green (G) and blue (B) filters.

In this example, there are twice as many green filters as red or blue ones, catering to the human eye's higher sensitivity to green light. The color sub-sampling of a CFA by its nature results in aliasing, and therefore optical anti-aliasing filters are placed in the optical path between the image sensor and the lens to reduce the false color artifacts (chromatic aliases) introduced by interpolation. Since each pixel of the sensor is behind a color filter, the output is an array of pixel values, each indicating a raw intensity of one of the three filter colors. The Bayer filter is an example of a CFA that uses a multivariate interpolation on a uniform grid. Thus, an algorithm is needed to estimate for each pixel the color levels for all color components, rather than a single component. Conventional demosaicing algorithm reconstruct a full color image from such spatially under sampled color channels output from the CFA or other filters.

The mathematical operations involved in such algorithms is simple as it is based on nearby instances of the same color component. The simplest method of such interpolation algorithm relies on the nearest-neighbor interpolation which simply copies an adjacent pixel of the same color channel. However, such filters are unsuitable for any application where details and quality of image are important. In addition, although these methods can obtain good results in homogenous image regions, they are prone to severe demosaicing artifacts in regions with edges and details when used with pure-color CFAs. More sophisticated demosaicing algorithms exploit the spatial and/or spectral correlation of pixels within a color image but they are still problematic as will be seen in more details by referring to FIG. 2B.

Figure 2A:
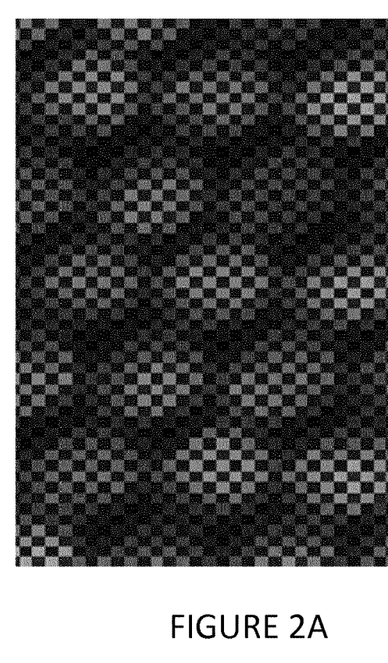
FIG. 2A is a depiction of an image and a micro lens array captured with a color filter array (CFA) pattern.

FIG. 2A is an exemplary embodiment showing an image obtained with a color filter array (CFA) pattern and an hexagonal lens grid using a plenoptic camera. FIG. 2A depicts the appearance of micro-images in a plenoptic camera. The lighter shade represents green (G) while the darkest shade represent blue (B) and the medium gray shade represent the color red (R). In this example, each pixel is illuminated by a sub-aperture of the exit pupil of the main lens. Due to the hexagonal sampling, the residual rotation between the lens and pixel grids and to the CFA, once the sub-aperture views are demultiplexed, the ensuing views may have information or color missing from it in some areas.

In order to recover the missing portions of the views or objects in a scene, it is possible to demosaic the raw data obtained by a plenoptic camera and then demultiplex to recover the views. The problem is that in most instances, this leads to color artifacts on the views. Consider a case where a neighbor pixels construction is used on a plenoptic raw image that contains different angular information (each pixel under a microlens corresponds to a different view). Demosaicing the raw plenoptic image in this case will potentially wrongly mixes angular information. In traditional algorithm that interpolate neighbor color values creating the so-called view cross-talk artifacts, this causes erroneous results. Furthermore, it has been shown in that disparity estimation from views obtained from the demosaiced raw image is prone to even larger errors.

Figure 2B:
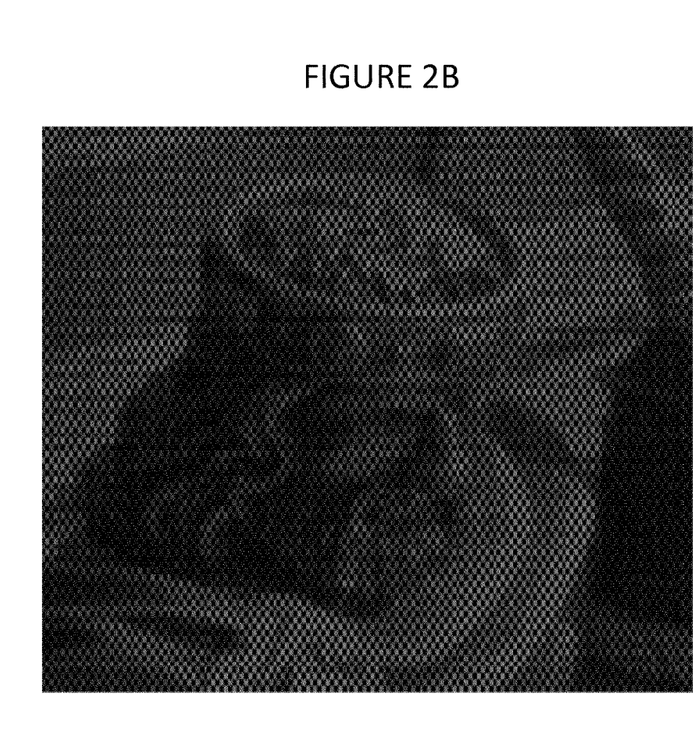
FIG. 2B is an illustration of a demultiplex image captured using a color filter and a micro lens array.

FIG. 2B is an illustration of a demultiplex image as discussed. In the illustrated example of FIG. 2B, a scene is provided with views or images of one or more objects. The image was captured by a plenoptic camera in this FIG. 2B. Looking at the view of FIG. 2B, it is difficult to recognize the image in the scene being presented. The overall contours an object is visible in FIG. 2B, but there are not sufficient information provided in the image to allow for detailed object recognition. Even in instances where shade, intensity and colors are not totally missing, the complementary color information has to be interpolated from distant pixels which are problematic in most instances. The latter means that the missing color is at best estimated (or even guessed) from other objects which may not even be local to the image.

In FIG. 2B, the image demosaiced yet, as there is missing color information, but the image is demultiplexed in the appropriate manner. Without demosaicing, the raw data requires to be demultiplexed into views of the scene, without being demosaiced. This will help avoid occurrence of color artifacts and help recover the missing color information such as produced by crosstalk. A block-matching technique can be used to estimate pixel disparities. Subsequently, reliable estimated disparities need to be used to demosaic images and views, exploiting the redundant sampling of the scene. The results do not contain color artifacts, compared to the state of art methods. An accurate view demultiplexing and sub-pixel accuracy of the estimated disparities, leads to spatial resolution of the demosaiced views of higher quality. This improvement in quality can be achieved without bearing the complexity of additional super-resolution steps. In one embodiment, this concept can be used to provide means for a much richer color acquisition. In this embodiment an electro-optical polarization modulator is used. In one embodiment electro-optical polarization modulator is a medium that is turned to birefringence when a voltage is applied.

Birefringence is the property of crystalline material that gives rise to production of two refracted rays when a ray hits them. This property is due to non isotropic distribution of atoms in the media and happens in crystalline media whose crystalline mesh structure is strongly non isotropic. Quartz and Calcite are natural material which exhibit birefringence. With those media, when a non polarized ray hits one of their surfaces which is at a special orientation, there are two rays that get created at refraction. One of these rays have one polarization characteristic and the other has a slightly different one. According to Snell-Descartes law: $n_i \sin \theta_i = n_r \sin \theta_r$ where $n_i$ and $n_r$ are the respective (and different) refractive indices of the incident and refracted medium and $\theta_i$ and $\theta_r$ are the incident and refracted angles.

In a birefringent media, the ray that obeys the Snell-Descartes law is called the ordinary ray and the medium has one ordinary index of refraction no. The second ray that is created undergoes another refraction $n_e$, it propagates in a direction within the material which has the extraordinary index ne and is polarized perpendicularly to the ordinary ray. In the birefringent medium, two rays are created with different propagation directions.

Birefringent materials refract rays according to Snell's law but the effective index of refraction in the medial depends upon the input polarization state and the angle the refracted ray makes with respect to the crystal axis. In a birefringent materials, the two type of rays can be defined as ordinary and extraordinary. Ordinary rays are refracted according to the Snell's principle $n \sin \theta = n_0 \sin \theta'$, where "0" indicates the ordinary index. For extraordinary rays, in birefringent cases, the refraction law provides that $n \sin \theta = n(\theta_w) \sin \theta'$, where the effective index of refraction in the birefringent materials is a function of the angle $\theta_w$. The angle $\theta_w$ is the angle between the crystal axis vector "a" and the refracted wave vector "k". Additionally, the ray vector "s", which is the vector pointing in the direction of energy propagation does not follow the wave vector "k", but makes small angles with respect to vector "k". In isotropic medial, vectors "k" and "s" are the same. Therefore, for most optical designs, vector "k" must be taken into consideration. In these cases, the angle $\theta_w$ is defined as:

$$\cos \theta_w = \hat{k} \cdot \hat{a}.$$

The effective index of refraction is defined by $$\left(\frac{1}{n(\theta_w)}\right)^2 = \left(\frac{\cos\theta_w}{n_0}\right)^2 + \left(\frac{\sin\theta_w}{n_e}\right)^2,$$

where $n_0$ is the ordinary and $n_e$ is the extraordinary index of refraction.

The angle $\alpha$ between $\hat{k}$ and $\hat{s}$ is defined by $$\cos\alpha = \hat{k} \cdot \hat{s}, \text{ where}$$

$$\tan\alpha = \frac{(n_e^2 - n_0^2)\tan\theta_w}{n_e^2 + (n_0\tan\theta_w)^2},$$

and the vectors $\hat{k}$ and $\hat{s}$ are both coplanar with the crystal axis vector $\hat{a}$. The wave vector $\hat{k}$ points along the normal to the wavefront, while $\hat{s}$ points along the direction of energy propagation.

Figures 3A, 3B:
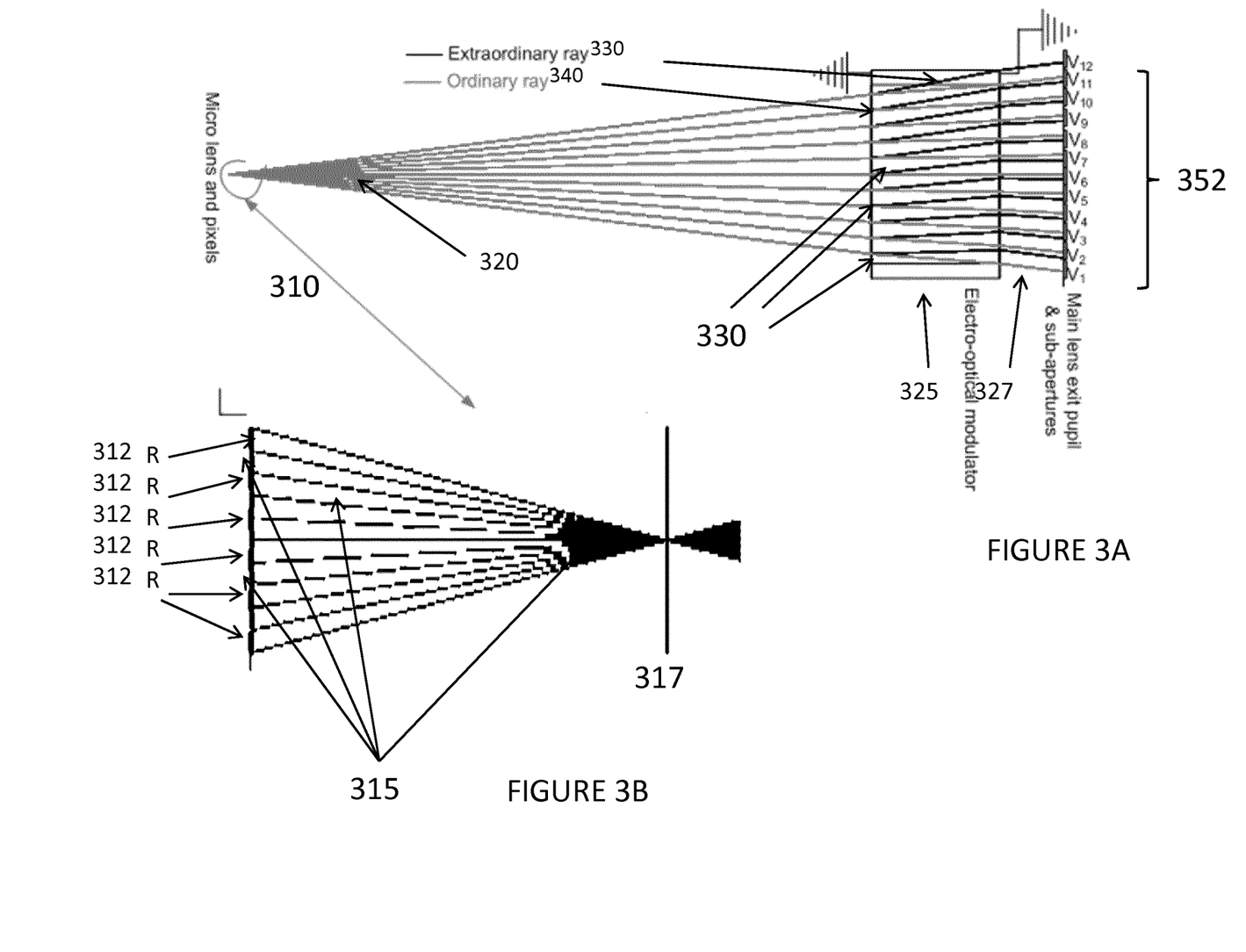
FIG. 3A is a depiction of a diagram for a sub-aperture to pixel mapping of both ordinary and extraordinary states according to one embodiment.
FIG. 3B provides a zoomed and more detail depiction of embodiment shown in FIG. 3A.

FIG. 3A illustrates a diagram for a sub-aperture to pixel mapping of both ordinary and extraordinary states. As shown a plurality of rays (shown generally as 320) are passed through an electro optical modulator shown by reference numerals 325. On the right hand side of the figure, there is the exit pupil of the main lens shown by reference numeral 327 generally. This main lens exit is further divided into sub apertures V1 to V12, as shown by reference numerals 352 collectively. In this embodiment, a birefringent medium is provided that can be electrically controllable. A variety of such mediums are available as can be appreciated by those skilled in the art. One such example, could be one that incorporates twisted liquid crystals nematic (TN). The TN liquid crystal can be sandwiched between two glass plates having transparent Indium Tin Oxide (ITO) electrodes, in one embodiment. In one example, in its ground state, with no voltage applied to the TN cell, the sub-apertures are imaged each onto one sole pixel per micro image following the green lines which depicts the ordinary rays.

FIG. 3B provides a zoomed and more detail picture depicting the area 310 as shown across the line 310. In this zoomed picture (310), one micro-lens and one column of the red-green pixels from the CFA (such as a Bayer CFA) is depicted. The red portions are illustrated by 312 and the green portions by reference numerals 315. The illustration of 310 shows how an ordinary ray can be mapped such that each sub-aperture is aligned to one pixel. To aid understanding, it is better to start with following the extraordinary rays 330 as provided in FIG. 3A first and follow these in a reverse order back to FIG. 3B's more detail area. This will result in a flow that runs from a pixels to sub-apertures direction.

Looking at FIG. 3A, and following the rays from left to right, the extraordinary ray 320 follows the electro optical modulator green ray path. It crosses the optical center of its micro-lens and then hits the birefringent cell. The cell is in its "extraordinary" state with an applied voltage and thus, this time, two rays are generated, the green which refracts as ordinary, and the blue one which refracts as the extraordinary ray. When both hit the exit pupil of the main lens, the ordinary ends up in one sub-aperture while the extraordinary maps into one sub-aperture above. This means that if we begin from the exit pupil, the sub-aperture's V11 ordinary ray will hit the bottom most pixel which is a green one. From the same V11 sub-aperture, the extraordinary ray will hit the second pixel from the bottom, which is red.

Adding color information to a plenoptic image requires two images to be taken sequentially. A first image is taken at t0 with the cell in the ordinary state. The pixels on the sensor do record the following states:

PV(t0,V11),PR(t0,V10),PV(t0,V9),PR(t0,V8), . . .

A second image is taken at t1 with the cell in its extraordinary state. Two rays of equal intensities are generated if there is no polarizing phenomenon in the scene:

PV(t1,V11)/2+PV(t1,V12)/2,PR(t1,V10)/2+PR(t1,V11)/2,PV(t1,V9)/2+PV(t1,V10)/2,PR(t1,V8)/2+PR(t1,V9)/2, . . .

Looking at FIG. 3, it is evident that the borders of the aperture will not benefit from increased color information, but border pixels are anyway discarded because of micro-image crosstalk and vignetting. So in one embodiment, the first image is subtracted from two times the second shot for pixels that are not borderline. This will be the second pixel from the bottom and can be defined as: PR=2×[PR(t1,V10)/2+PR(t1,V11)/2]−PR(t0,V10).

If there are no movements between two scenes at t=0 and t=1 (t0 and t1), then:

PR=2×[PR(t1,V10)/2+PR(t1,V11)/2]−PR(t0,V10)=PR(V10)+PR(V11)−PR(V10)=PR(V11).

Hence, a red component for the sub-aperture V11 is produced, while from shot at t0, a green component for the sub-aperture V11 is also present.

Applying this concept for the rest of the pixels, if two scene shots are produced at t0 and t1, from these a linear combination of pixel values can be obtained that allows for two times more color information than usually provided using conventional methods. In one example, the additional component used in this system is twisted nematic (TN) cell.

The Liquid Crystal (LC) can have a big difference in value between the ordinary n0 and extraordinary ne indices of refraction. In some cases, a LC mixture named MLC-9200-100 (Refractive Indices of Liquid Crystals for Display Applications) is known for having ne−n0>0.2 which is a very big difference but is needed in order to reduce the thickness of the cell from FIG. 3. This thickness is not yet compatible with a placement of the cell between the micro-lens array and the sensor, but it can be placed between the exit pupil and the micro-lens array as it reduces to few mm in thickness. (micro-lens to sensor distance is in the range of 10-100 microns).

Figure 4:
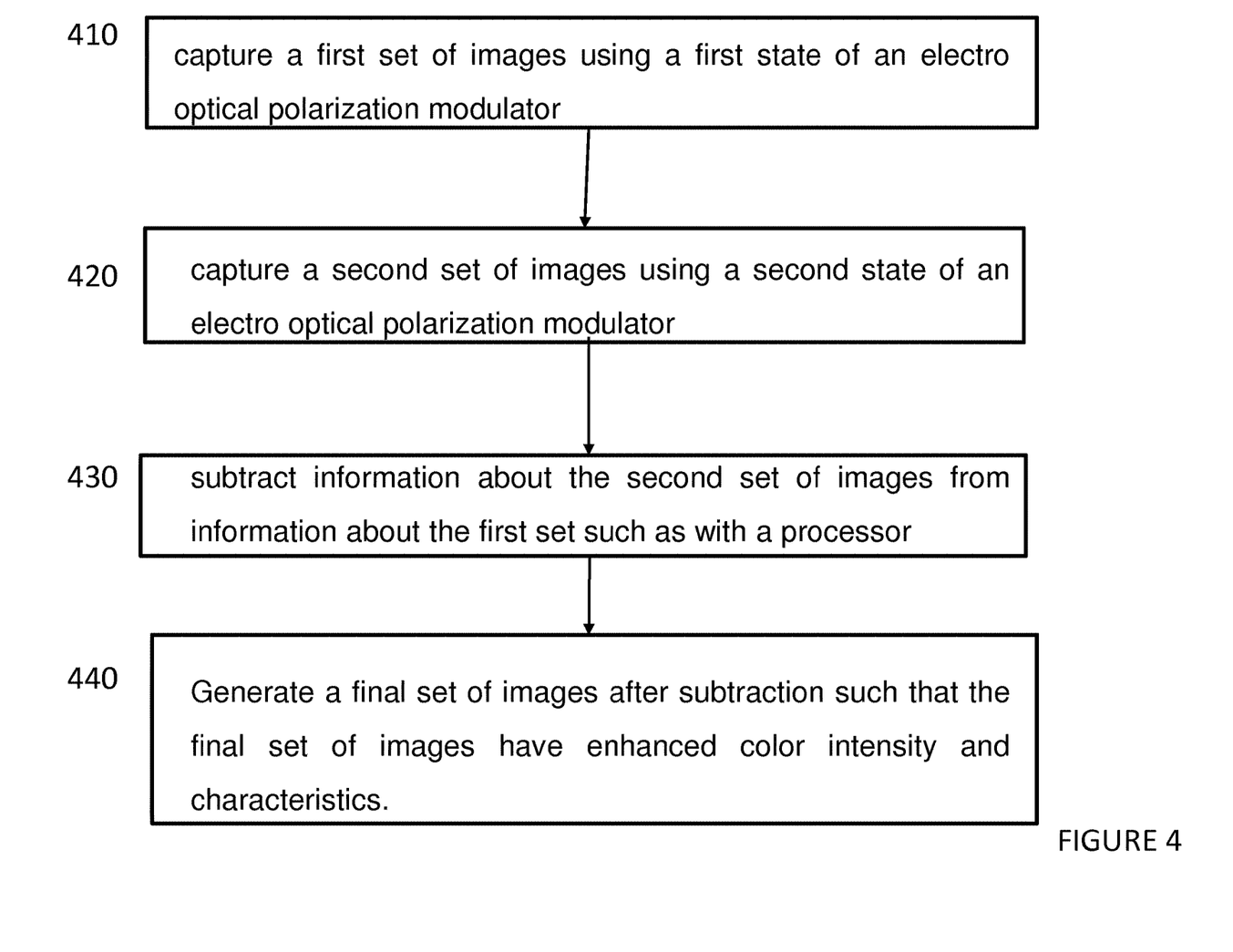
FIG. 4 is a flow chart depiction of the process explained above according to one embodiment.

FIG. 4 is a flow chart depiction of the process explained above according to one embodiment. FIG. 4 illustrates the steps for a method of generating multiple images of different color intensity and characteristics using a plenoptic camera having a main lens disposed ahead of an array of lenses having a plurality of apertures. As shown in FIG. 4 at step 410, a first set of images are captured using a first state of an electro optical polarization modulator. In one embodiment, the modulator is disposed between said main lens and array of lenses with plurality of apertures. In step 420, a second set of images are captured using a second state of an electro optical polarization modulator. In step 430 the information about the second set of images is subtracted, such as for example with a configured processor, from information about the first set. In step 440, a final set of images are generated after the subtraction such that said final set of images have enhanced color intensity and characteristics. In one embodiment, a system for generating multiple images of different color intensity and characteristics can be used to conduct the method steps of FIG. 4 and the arrangement of FIGS. 3A and 3B. In this embodiment, a main lens (310) disposed in front of an array of lenses (352) associated with a plurality of apertures. An electrically controlled electro optical modulator (325) such as shown in FIG. 3A can be disposed between the micro lens and the array of lenses shown. The electro optical modulator functions between the two states (330 and 340 in FIG. 3A) upon application of an electrical voltage. The first set of images are then captured using the first state of an electro optical polarization modulator and a second set of images are also captured using a second state of an electro optical polarization modulator as discussed in conjunction with FIG. 4. Subsequently, a processor can be incorporated into the system that is configured to subtract information about said second set of images from information about the first set of captured images to generate (440 in FIG. 4) a final set of images with enhanced color intensity and characteristics. In this manner rich color information can be obtained, even in a very complicated situation, where a plenoptic camera delivers very sparse color information.

The invention claimed is:

1. A method of generating multiple images comprising:
   generating a first set of images using a first state of an electro optical polarization modulator; said modulator being disposed between a main lens and a micro array of lenses;
   generating a second set of images using a second state of an electro optical polarization modulator;
   determining information by subtracting said second set of images from information about said first set; and
   generating a final set of images after said subtraction.

2. The method of claim 1, wherein said second state is achieved upon application of an electrical voltage.

3. The method of claim 1, wherein said electro optical polarization modulator is originally at a first state and changes to a second state after electrical voltage is applied to said electro optical polarization modulator and wherein said electro optical polarization modulator returns back to its first original state in absence of electrical voltage.

4. The method of claim 1 wherein said elector optical polarization modulator is made from a birefringent crystalline material.

5. The method of claim 1 wherein said electro optical polarization modulator produces two simultaneous rays of light received from said main lens, such that a first ray is mapped into a first lower aperture and a second aperture located above said first lower aperture and said apertures are associated with said lens array.

6. The method of claim 1, wherein a sensor is disposed between said micro lens array and said main lens.

7. The method of claim 6 wherein said first and said second rays have different angles of refraction.

8. The method of claim 6 wherein said first and second rays have a different index of refraction.

9. The method of claim 1 wherein a first ordinary ray and a second extraordinary rays are polarized in a direction perpendicular to one another.

10. The method of claim 1 wherein said ordinary and extraordinary rays are being created with different propagation distances.

11. A system for generating multiple images, comprising
   a main lens disposed in front of a micro array of lenses associated with a plurality of apertures;
   an electrically controlled electro optical modulator disposed between said micro array of lens and said main lens;
   said electro optical modulator functioning between a first state and a second state;
   a processor configured for
   generating a first set of images using a first state of said electro optical modulator; said modulator being disposed between a main lens and a micro array of lenses and also for generating a second set of images using a second state of said electro optical modulator; and
   said processor also configured to determine information by subtracting said second set of images from said first set of images to generate a final set of images after said subtraction.

12. The system of claim 11, wherein said second state is achieved upon application of an electrical voltage.

13. The system of claim 12 wherein said electro optical modulator is originally at a first state and changes to a second state after electrical voltage is applied to said electro optical polarization modulator and wherein said electro optical polarization modulator returns back to its first original state in absence of electrical voltage.

14. The system of claim 11, wherein said elector optical modulator is made from a birefringent crystalline material.

15. The system of claim 14, wherein said birefringent crystalline material is a Liquid Crystal (LC).

16. The system of claim 11, wherein said electro optical polarization modulator produces two simultaneous rays of light received from said main lens, such that a first ray is mapped into a first lower aperture and a second aperture located above said first lower aperture and said apertures are associated with said lens array.

17. The system of claim 16 wherein a first ordinary ray and a second extraordinary rays are polarized in a direction perpendicular to one another.

18. The system of claim 17, wherein said ordinary and extraordinary rays are being created with different propagation distances.

19. The system of claim 11, wherein a sensor is disposed between said micro lens array and said main lens.

20. The system of claim 19, wherein distance between said micro lens array and said sensor is greater than 10 but less than 100 microns.

* * * * *